(12) United States Patent
Green

(10) Patent No.: US 10,781,887 B2
(45) Date of Patent: Sep. 22, 2020

(54) SYNCHRONIZED DUAL DRIVE GEAR ASSEMBLIES AND METHODS

(71) Applicant: Illinois Tool Works Inc., Glenview, IL (US)

(72) Inventor: Shawn M. Green, Alexandria, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 527 days.

(21) Appl. No.: 15/787,143

(22) Filed: Oct. 18, 2017

(65) Prior Publication Data

US 2018/0038447 A1    Feb. 8, 2018

Related U.S. Application Data

(60) Division of application No. 14/641,509, filed on Mar. 9, 2015, which is a continuation of application No. 14/486,677, filed on Sep. 15, 2014, now abandoned.

(60) Provisional application No. 61/878,892, filed on Sep. 17, 2013.

(51) Int. Cl.
| | |
|---|---|
| *F16H 1/14* | (2006.01) |
| *F16H 1/16* | (2006.01) |
| *F16H 1/18* | (2006.01) |
| *F16H 1/22* | (2006.01) |
| *F16H 1/20* | (2006.01) |

(52) U.S. Cl.
CPC .............. *F16H 1/222* (2013.01); *F16H 1/206* (2013.01); *F16H 1/22* (2013.01); *Y10T 74/19019* (2015.01)

(58) Field of Classification Search
CPC .................. F16H 1/14; F16H 1/16; F16H 1/18
USPC ...... 74/665 GC, 665 GD, 665 H, 421 A, 417
See application file for complete search history.

(56) References Cited

U.S. PATENT DOCUMENTS

| | | | | |
|---|---|---|---|---|
| 2,479,406 A * | 8/1949 | Rapuano | ................ | B64D 27/00 74/423 |
| 3,408,954 A * | 11/1968 | Kademann | ................ | B61C 9/52 105/34.1 |
| 3,727,574 A * | 4/1973 | Bagge | .................. | B63H 20/002 440/66 |
| 5,233,886 A * | 8/1993 | Bossler, Jr. | ................ | F16H 1/12 74/411 |
| 6,855,087 B2 * | 2/2005 | Chakraborty | .......... | B60K 17/16 475/225 |

\* cited by examiner

*Primary Examiner* — Ha Dinh Ho
(74) *Attorney, Agent, or Firm* — Christopher R. Carroll; The Small Patent Law Group LLC

(57) ABSTRACT

A gear assembly includes an actuation gear and plural separate pinion bodies. The actuation gear has first gear teeth on one or more surfaces of the gear and is configured to rotate around an actuation axis of rotation. The pinion bodies have second gear teeth configured to mesh with the first gear teeth of the actuation gear in plural separate mesh zones of the actuation gear. Each of the plural separate pinion bodies are configured to be rotated about respective pinion axes of rotation to cause rotation of the actuation gear around the actuation axis of rotation.

21 Claims, 16 Drawing Sheets

SYNCHRONIZED DUAL DRIVE GEAR ASSEMBLIES AND METHODS

CROSS-REFERENCE TO RELATED APPLICATIONS

This application is a divisional of U.S. application Ser. No. 14/641,509, which was filed on Mar. 9, 2015, and which is a continuation of, U.S. application Ser. No. 14/486,677, which was filed on Sep. 15, 2014. U.S. application Ser. No. 14/486,677 claims priority to U.S. Provisional Application No. 61/878,892, which was filed on Sep. 17, 2013. The entire disclosures of these applications are incorporated herein by reference.

BACKGROUND

Gears are used to, among other things, transmit power from one device to another and/or change a direction of an applied force. Many types of gears are known, such as straight gears, angle gears, bevel gears, worm gears, combinations of these gears, and others. Also known are SPIROID brand gears that use a curved gear tooth. Such a configuration of gears permits larger loads to be transferred due to the increased surface area of gear tooth relative to a straight gear formed on a similar blank.

Certain applications may require gears that withstand high loads (e.g., forces). Generally, the ability to withstand such forces is accomplished by using larger gears to increase the area on the gear teeth over which the forces are exerted. The ability to withstand forces is balanced against size requirements, or conversely size limitations, of the gear assembly. While the SPIROID gear accomplishes this, at times, even smaller size limitations may apply. Accordingly, there is a need for a gear system that can withstand high loads/forces in a limited or small size application that can overcome the inherent assembly limitations described. Concurrently there is also a need for a gear system that can also operate synchronously to mitigate the mechanical limitations of torque transfer described.

Specifically, there is a need for an electromechanical actuation system that can withstand high loads/forces in a limited size application to operate (for example) industrial or military grade pipeline and pipe system control valves. One such application includes, but is not limited to, submersible vehicle pipe control valve systems. Other useful applications may include oil and gas pipeline valve controls; industrial systems valves in various types of electrical power generation, steam turbine systems, and refinery or processing systems.

Some known gear assemblies include enveloping gear arrangements that include an enveloping gear arrangement having two or more surfaces with curved gear teeth that mesh with teeth of a single pinion. The single pinion engages the enveloping gear in multiple locations for the purpose of increasing power and torque output without substantially increased space claim or size. Such gear assemblies, however, have been found to have deficiencies. For example, in order for the elongated pinion to simultaneously engage the multiple surfaces of the enveloping gear, the pinion and enveloping gear may need to be arranged such that the pinion and gear rotate around non-orthogonal axes and non-parallel axes with respect to each other. For example, the axis around which the pinion rotates may not be parallel to or perpendicular to the axis around which the enveloping gear rotates. This arrangement can be referred to as a skew-axis arrangement.

A skew-axis gear arrangement can often preclude ready incorporation of the gear assembly into an actuator design due to added complexities of bearing arrangements and support, atypical housing and mounting features that increase machining, fabrication, and assembly complexities; and general reluctance by potential end-users to adopt the technology due to added complexities with incorporating atypical mounting and motor connection features into their systems. For these reasons, a need exists for gear assemblies which may help to obviate the problems listed above.

BRIEF SUMMARY

In an embodiment, a gear assembly includes an actuation gear and plural separate pinion bodies. The actuation gear has first gear teeth on one or more surfaces of the gear and is configured to rotate around an actuation axis of rotation. The pinion bodies have second gear teeth configured to mesh with the first gear teeth of the actuation gear in plural separate mesh zones of the actuation gear. Each of the plural separate pinion bodies are configured to be rotated about respective pinion axes of rotation to cause rotation of the actuation gear around the actuation axis of rotation.

In an embodiment, a gear assembly includes an actuation gear and plural separate pinion bodies. The actuation gear has first gear teeth on one or more surfaces of the gear. The pinion bodies have second gear teeth configured to mesh with the first gear teeth of the actuation gear in plural separate mesh zones of the actuation gear. The plural separate pinion bodies are configured to be rotated about respective parallel pinion axes of rotation to cause rotation of the actuation gear around an actuation axis of rotation of the actuation gear. The pinion axes of rotation are oriented perpendicular to the actuation axis of rotation.

BRIEF DESCRIPTION OF THE DRAWINGS

The benefits and advantages of the presently described inventive subject matter will become more readily apparent to those of ordinary skill in the relevant art after reviewing the following detailed description and accompanying drawings, wherein.

DETAILED DESCRIPTION

Figure 1:
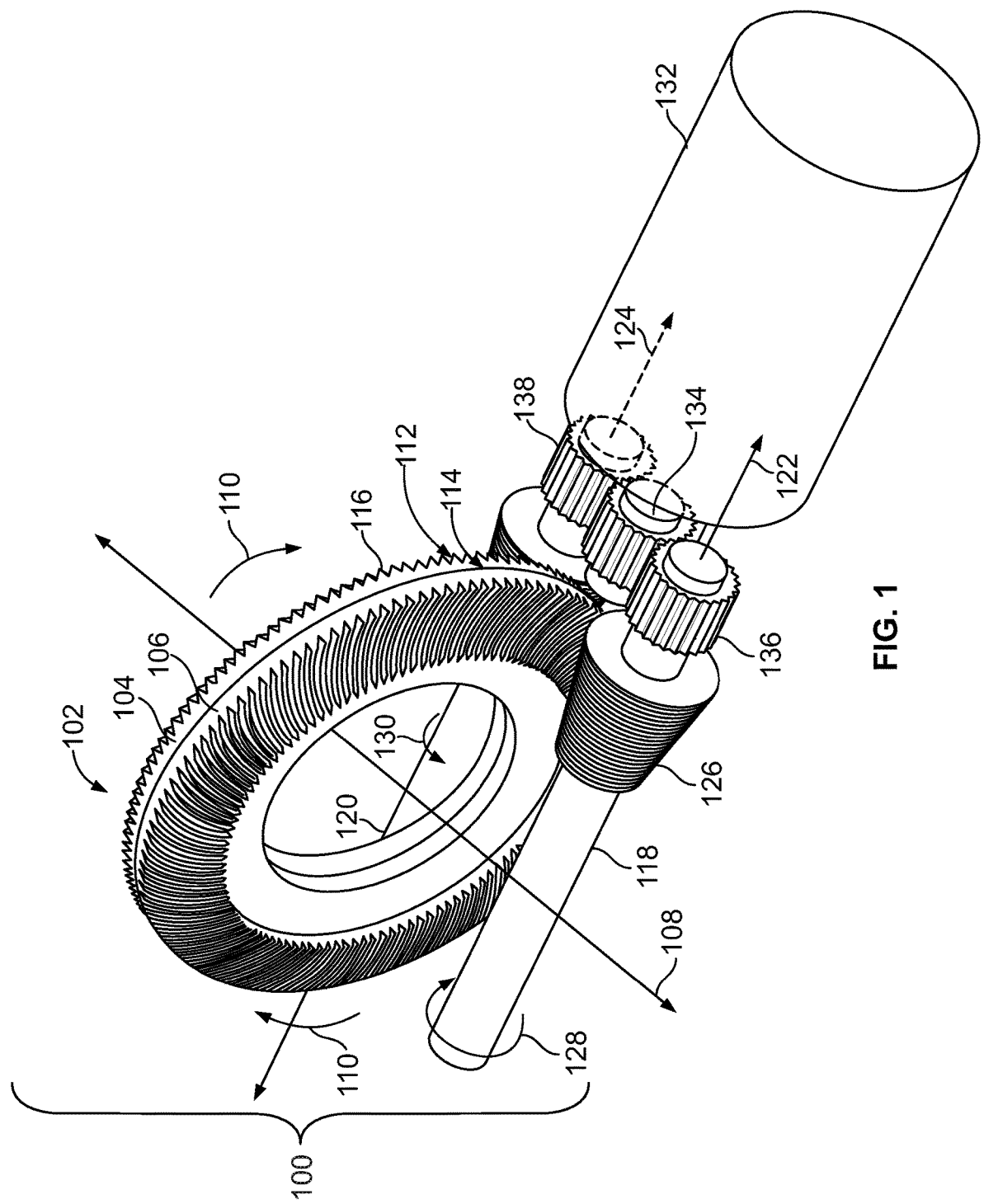
FIG. 1 is a perspective view of an embodiment of a gear assembly.

While the presently described inventive subject matter is susceptible of embodiment in various forms, there is shown in the drawings and will hereinafter be described example embodiments of the inventive subject matter with the understanding that the present disclosure is to be considered an exemplification of the inventive subject matter and is not intended to limit the scope of the inventive subject matter to the specific illustrated embodiments. It should be understood that the title of this section of this specification, namely, "Detailed Description," relates to a requirement of the United States Patent Office, and does not imply, nor should be inferred to limit the subject matter disclosed herein.

Figure 2:
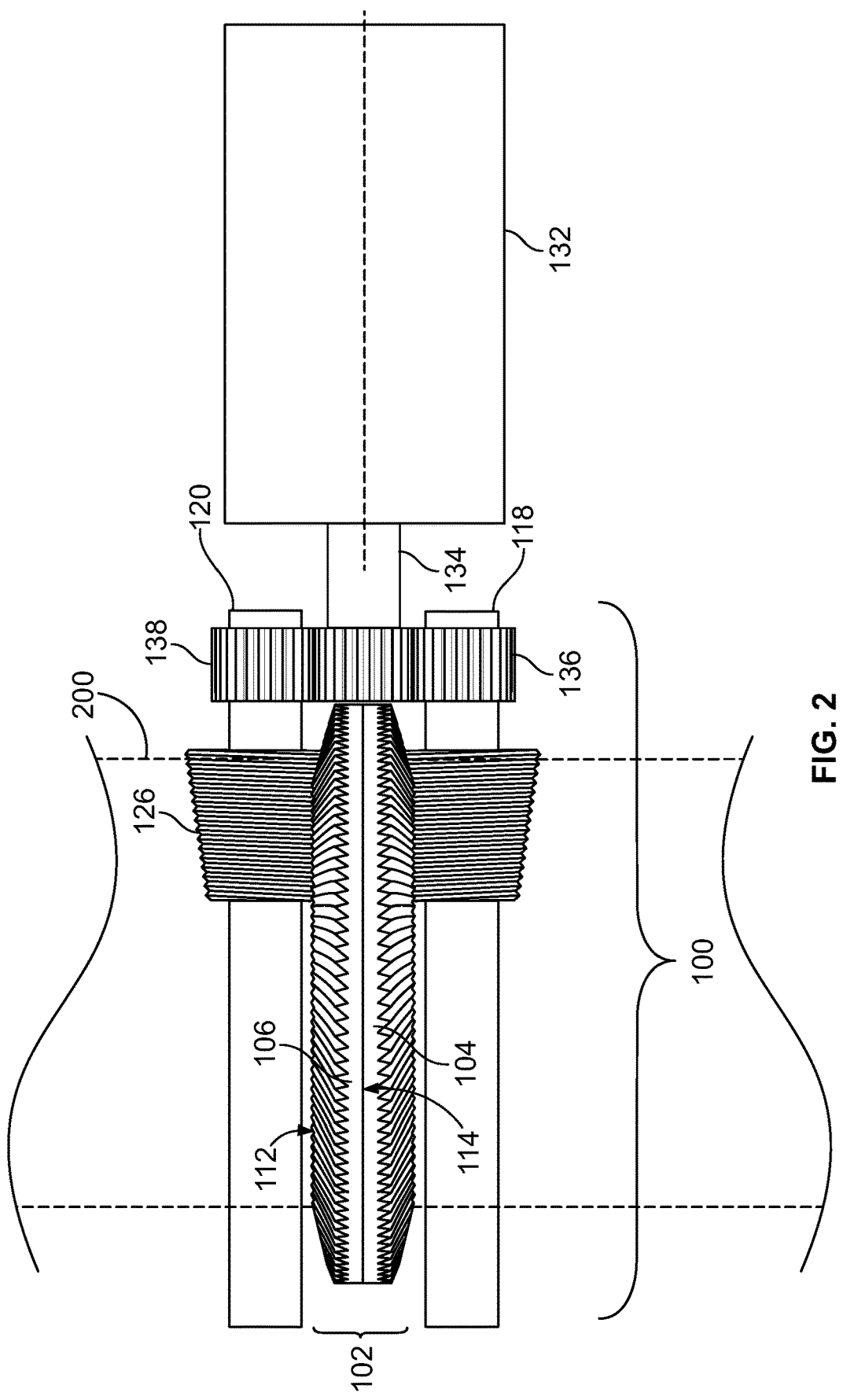
FIG. 2 is a top view of the gear assembly shown in FIG. 1.
Figure 3:
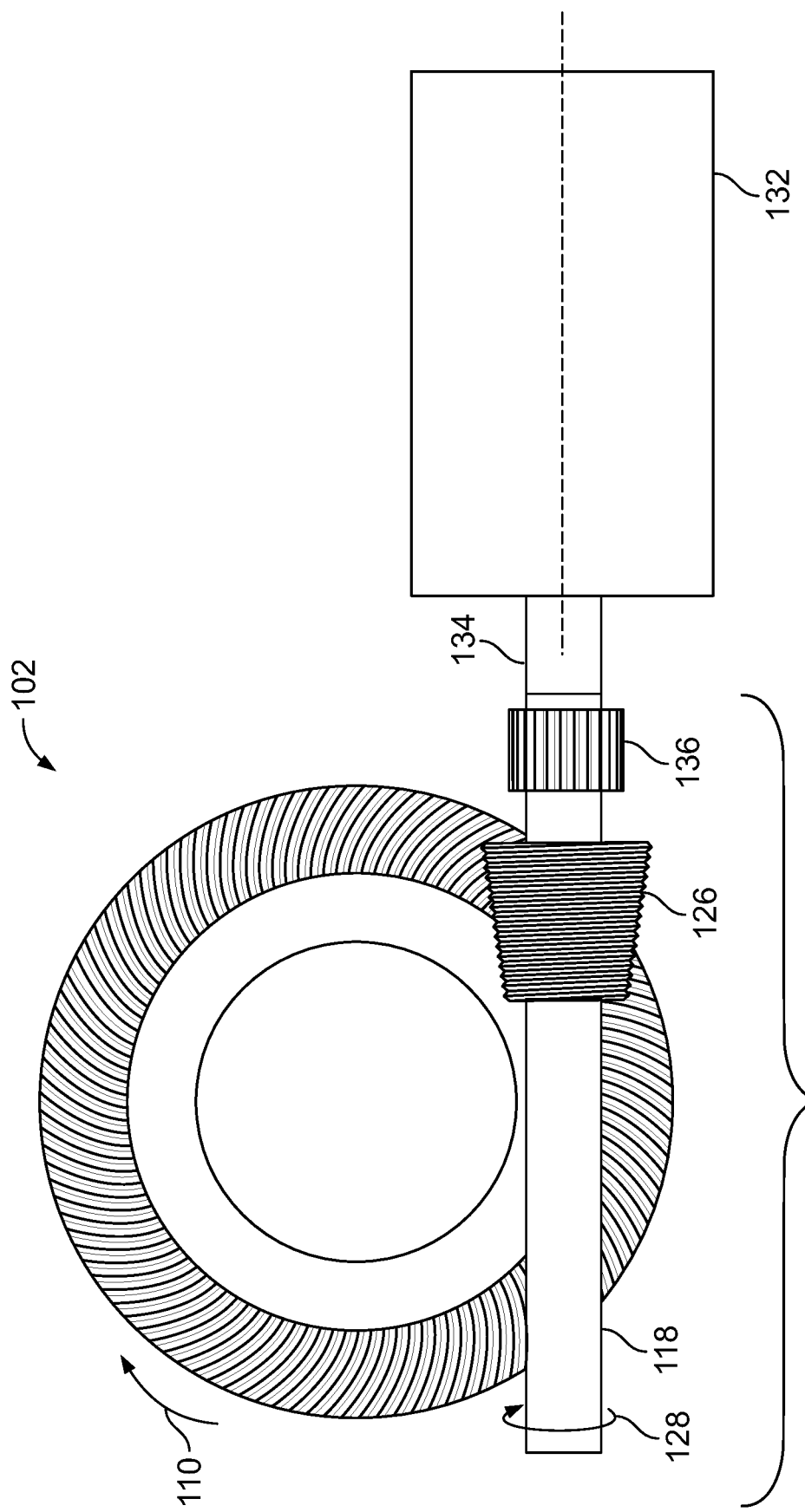
FIG. 3 is a side view of the gear assembly shown in FIG. 1.
Figure 4:
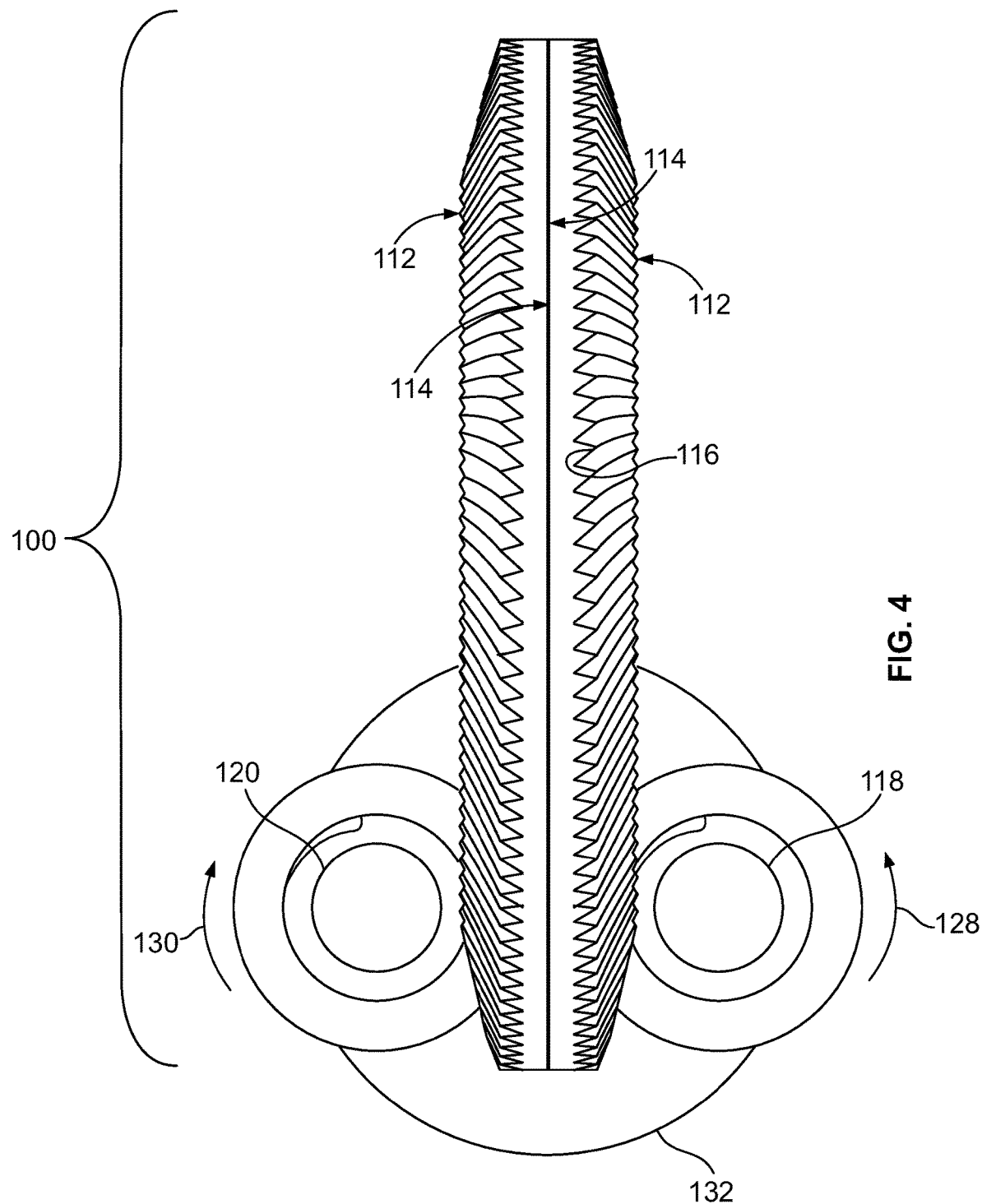
FIG. 4 is a front view of the gear assembly shown in FIG. 1.

FIG. 1 is a perspective view of an embodiment of a gear assembly 100. FIG. 2 is a top view of the gear assembly 100 shown in FIG. 1. FIG. 3 is a side view of the gear assembly 100 shown in FIG. 1. FIG. 4 is a front view of the gear assembly 100 shown in FIG. 1. The gear assembly 100 includes an actuation gear 102 formed from plural (e.g., two) separate and separable single piece gear bodies 104, 106. Optionally, the gear 102 may be formed as a single, continuous, and/or homogenous body and not plural separate gear bodies 104, 106 that are joined together. The gear bodies 104, 106 and gear 102 each include a common actuation axis of rotation 108 such that the gear 102 rotates about the axis of rotation 108 along the illustrated direction 110 (or an opposite direction). Each of the gear bodies 104, 106 include opposite first and second surfaces 112, 114, with the first surface 112 having gear teeth 116 formed therein. Although only the surfaces 112, 114 of the gear body 104 are labeled in FIG. 1, the gear body 106 may include similar or identical surfaces 112, 114. The gear teeth 116 may be SPIROID curved gear teeth or other gear teeth. The first surfaces 112 may be referred to as teeth surfaces as these surfaces 112, include the gear teeth 116.

As shown in FIG. 1, the first surfaces 112 of the gear bodies 104, 106 may face away from each other and the second surfaces 114 of the gear bodies 104, 106 may face and/or engage each other when the gear bodies 104, 106 are joined together to form the gear 102. Consequently, the gear teeth 116 are disposed on opposite sides of the gear 102 and face away from each other. For example, the gear teeth 116 may radially extend outward from the axis of rotation 108 and away from the second surface 114 for each of the gear bodies 104, 106. The gear bodies 104, 106 can be co-axially arranged such that the second surfaces 114 are facing and contacting each other while the first surfaces 112 that include the gear teeth 116 are in opposition to each other, such that the gear teeth 116 face outward.

The gear assembly 100 may also include plural separate and separable pinion bodies 118, 120. The pinion bodies 118, 120 rotate about (e.g., around) separate pinion axes of rotation 122, 124. In the illustrated embodiment, the axes of rotation 122, 124 of the pinion bodies 118, 120 are parallel to each other and are perpendicular to the axis of rotation 108 of the gear 102. The axes of rotation 122, 124 are laterally offset (e.g., spaced apart) from each other such that the axes of rotation 122, 124 are not in-line (e.g., collinear) with each other in the illustrated example. For example, the illustrated pinion bodies 118, 120 are arranged in parallel and offset positions in a co-planar arrangement on the outside and adjacent to the first surfaces 112 of the gear 102. The pinion bodies 118, 120 are disposed on opposite sides of the gear 102. The pinion bodies 118, 120 shown in FIG. 1 are elongated in directions along the axes of rotation 122, 124, which are oriented parallel to each other and perpendicular to the axis of rotation 108 of the gear 102. The pinion bodies 118, 120 are co-planar with respect to each other such that the axes of rotation 122, 124 may be disposed in the same common plane. With respect to the terms "parallel" and "perpendicular," the axes that are parallel or perpendicular to each other may be slightly off from being exactly parallel or exactly perpendicular. For example, due to manufacturing tolerances, two axes described herein may be parallel to each other when the axes are substantially parallel (e.g., within a few angular degrees) and may be perpendicular to each other when the axes are substantially perpendicular (e.g., within a few angular degrees).

The pinion bodies 118, 120 may be single piece bodies or formed from multiple parts joined together. The pinion bodies 118, 120 include gear teeth 126 shaped to engage (e.g., mesh with) the gear teeth 116 of the gear 102. For example, the gear teeth 126 may be SPIROID gear teeth formed co-axially on or in the pinion bodies 118, 120. Optionally, the gear teeth 126 may be another type of gear teeth. The pinion bodies 118, 120 are laterally offset from each other such that the gear teeth 126 for the pinion body 118 engage (e.g., mesh with) the gear teeth 116 on the opposite surfaces 112 of the gear 102 at the same time (e.g., concurrently or simultaneously). This engagement between the teeth 126 of the pinion bodies 118, 120 and the teeth 116 of the gear 102 translates rotation of the pinion bodies 118, 120 into rotation of the gear 102 (and/or translation rotation of the gear 102 into translation of the pinion bodies 118, 120). For example, rotation of the pinion body 118 around the axis 122 in the direction 128 and/or rotation of the pinion body 120 around the axis 124 in the direction 130 may cause rotation of the gear 102 about the axis 108 in the direction 110. Conversely, the pinion bodies 118, 120 and gear 102 may be rotated in opposite directions.

In operation, the pinion bodies 118, 120 may be rotated by a torque generating device 132. The torque generating device 132 can include or represent one or more different systems, machines, assemblies, persons, or the like, that rotate one or more of the pinion bodies 118, 120 about the axes of rotation 122, 124. For example, the device 132 may include or represent one or more of a manual hand crank or hand wheel device, an electrically powered motor (e.g., alternating or direct current drive or servomotor), hydraulic motor, or the like. In the illustrated example, the device 132 is a motor, such as an electric motor, that concurrently or simultaneously rotates the pinion bodies 118, 120. The device 132 may include or be coupled with an input drive gear 134 having teeth that engage (e.g., mesh with) teeth of drive gears 136, 138 connected or included in the pinion bodies 118, 120.

The input drive gear 134 synchronizes the movement (e.g., rotation) of the pinion bodies 118, 120 with the rotation of the input drive gear 134 by the device 132. For example, the device 132 can generate torque to rotate the input drive gear 134, which then transfers this torque to the pinion bodies 118, 120 via the engagement between the teeth of the gear 134 and the teeth of the pinion bodies 118, 120. As a result, the speed of rotation of the pinion bodies 118, 120 by the single device 132 is the same or substantially the same.

The gear 102 may be coupled with one or more other components, such as a shaft, rod, or other device, such that rotation of the pinion bodies 118, 120 by the device 132 causes the gear 102 to rotate the one or more other components. For example, a shaft 200 (represented by phantom lines in FIG. 2) may be disposed through the opening in the gear 102 such that the shaft is oriented (e.g., elongated) along the axis of rotation 108). The shaft 200 may be an actuation device or coupled with an actuation device that causes the opening or closing of a valve or other component to move when the shaft 200 is rotated. As a result, rotation of the pinion bodies 118, 120 by the device 132 is translated by the gear assembly 100 into actuation of the device to which the gear assembly 100 is joined, such as by the shaft 200. In the illustrated example, the pinion bodies 118, 120 rotate around the respective axes of rotation without linearly moving. For example, the pinion bodies 118, 120 may not move along the axes of rotation, such as in left or right directions in the view of FIG. 2. In contrast to a rack and pinion arrangement, where a gear engages a rack that linearly moves relative to the gear, the pinion bodies 118, 120 and/or gear 102 may rotate, but not linearly move, in one embodiment.

Connecting plural pinion bodies 118, 120 with the device 132 and with the gear 102 can increase a torque capacity of the gear 102. The torque capacity represents a limit on the amount of torque or other force that can be transferred from the device 132 to the gear 102 via the pinion bodies 118, 120. For example, a torque capacity may represent the maximum amount of force that may be exchanged between the teeth 126 of the pinion bodies 118, 120 and the teeth 116 of the gear 102. The torque capacity of the gear 102 is increased by dividing the total torque provided by the device 132 between the plural pinion bodies 118, 120. For example, approximately one half of the total torque generated by the device 132 may be transferred the pinion body 118 and approximately the other half of this total torque generated by the device 132 may be transferred to the pinion body 120. These two approximate halves of the total torque are then transferred from the pinion bodies 118, 120 to the gear 102 by the plural mesh zones or areas between the pinion bodies 118, 120 and the gear 102. The term "mesh zone" or "mesh area" refers to the locations or regions where the pinion bodies 118, 120 (e.g., the teeth 126) engage the gear 102 (e.g., the teeth 116). The gear 102 receives all or a substantial portion of the total torque generated by the device 132 via these plural mesh zones or areas, without the entire or substantial portion of this torque being directly transferred to the gear 102 via a single mesh zone or area. Consequently, a larger amount of torque may be able to be transferred to the gear 102 from the device 132 without damaging the gear 102 (e.g., stripping the teeth 116).

Figure 5:
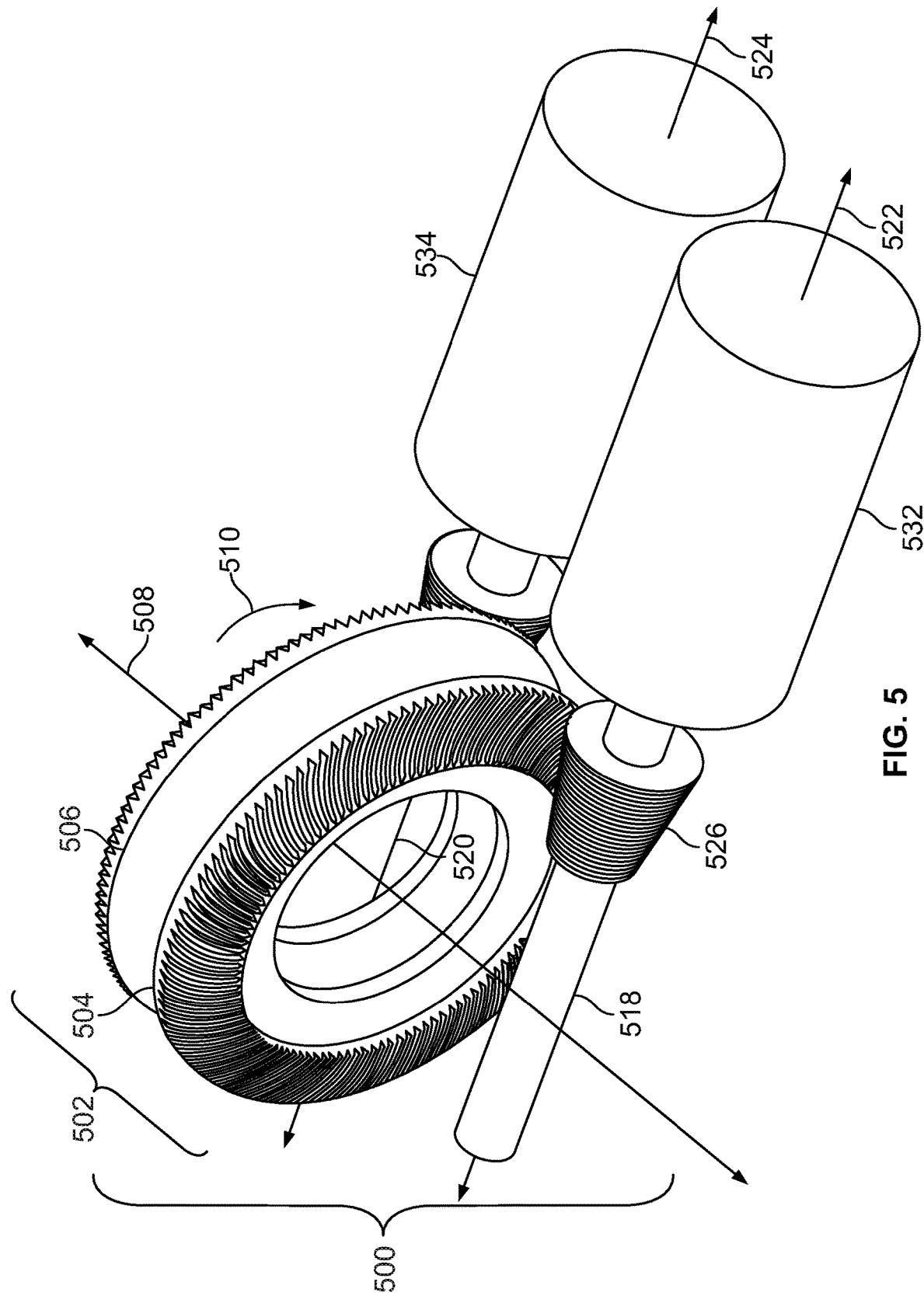
FIG. 5 is a perspective view of an embodiment of another gear assembly.
Figure 6:
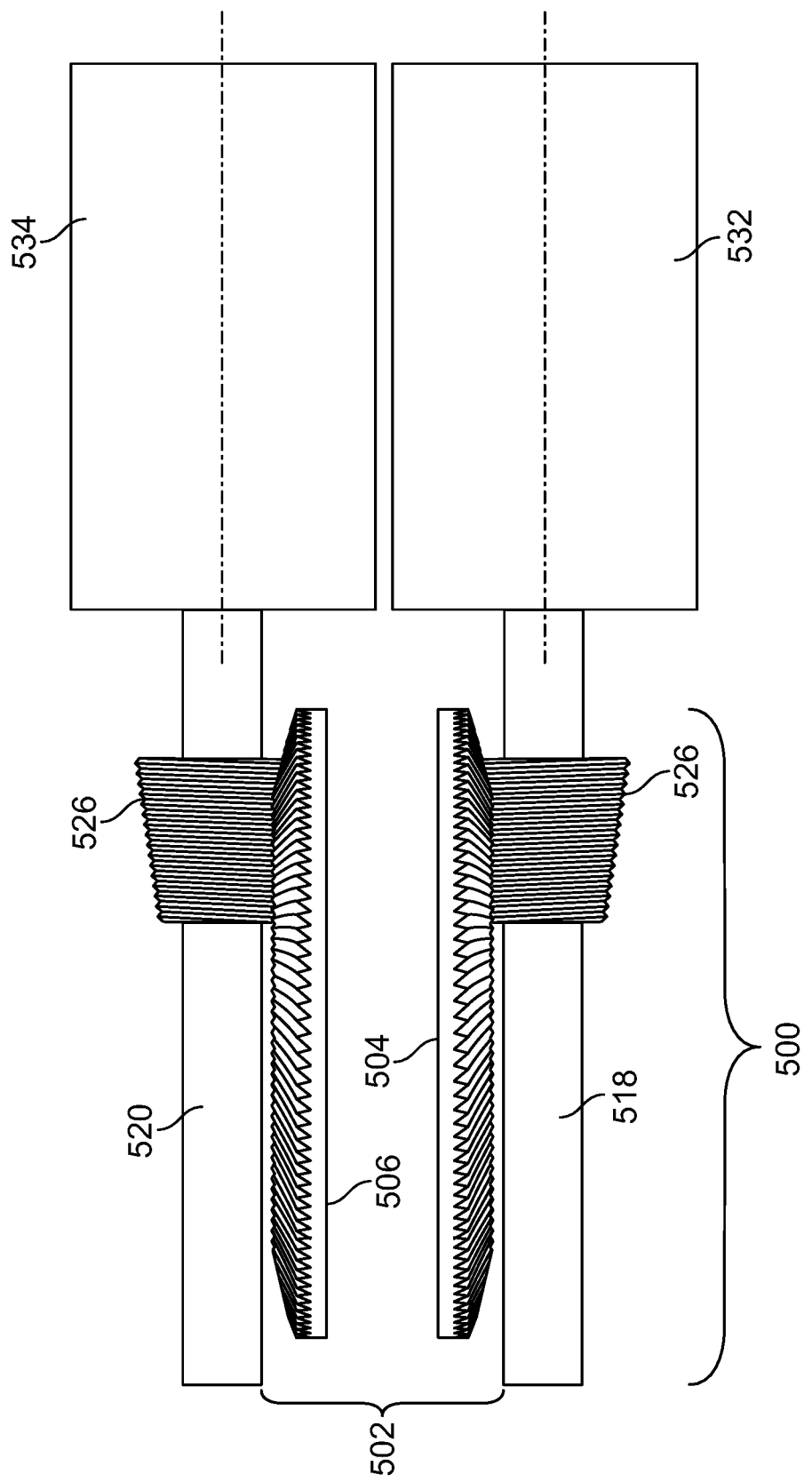
FIG. 6 is a top view of the gear assembly shown in FIG. 5.
Figure 7:
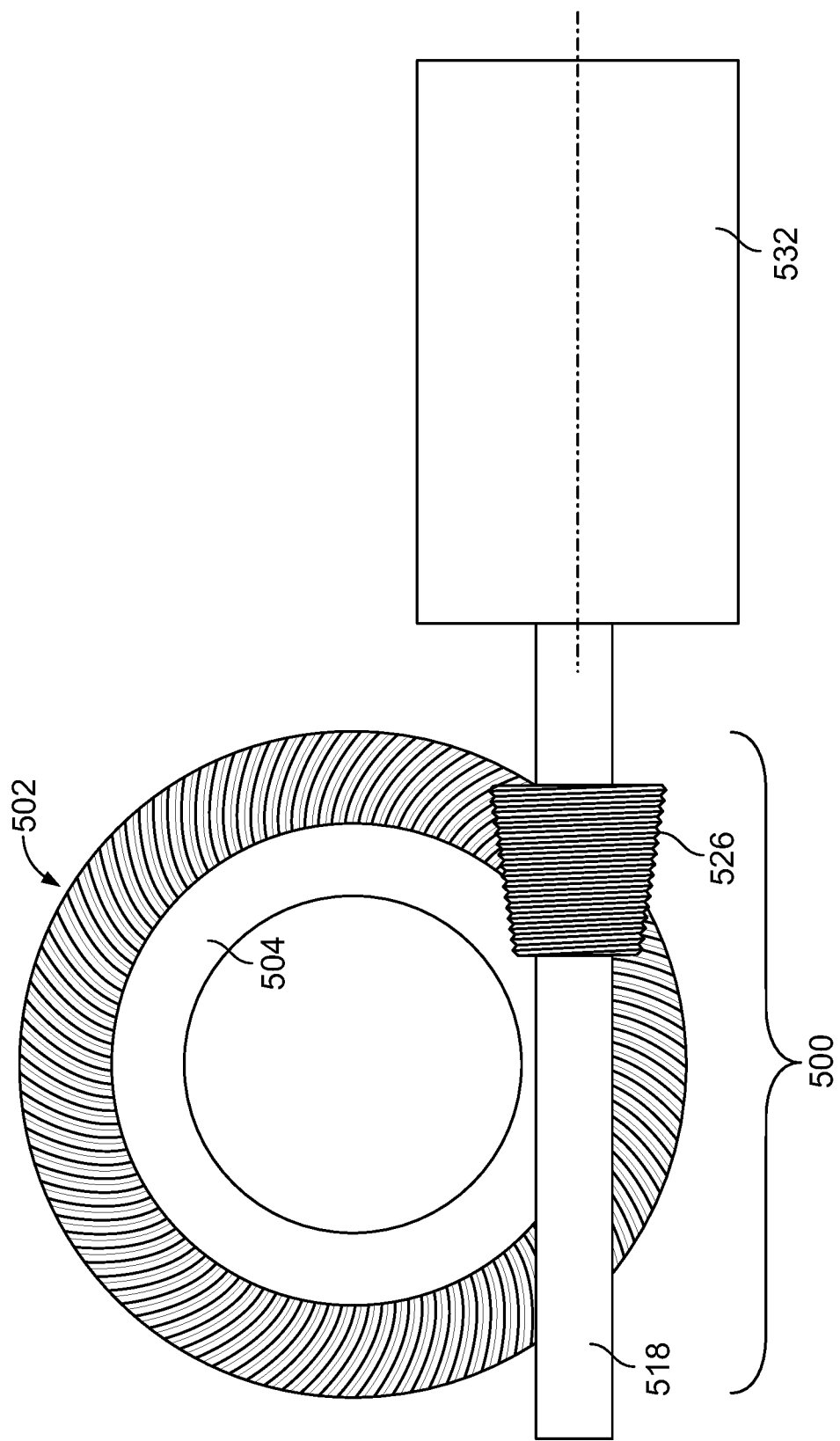
FIG. 7 is a side view of the gear assembly shown in FIG. 5.
Figure 8:
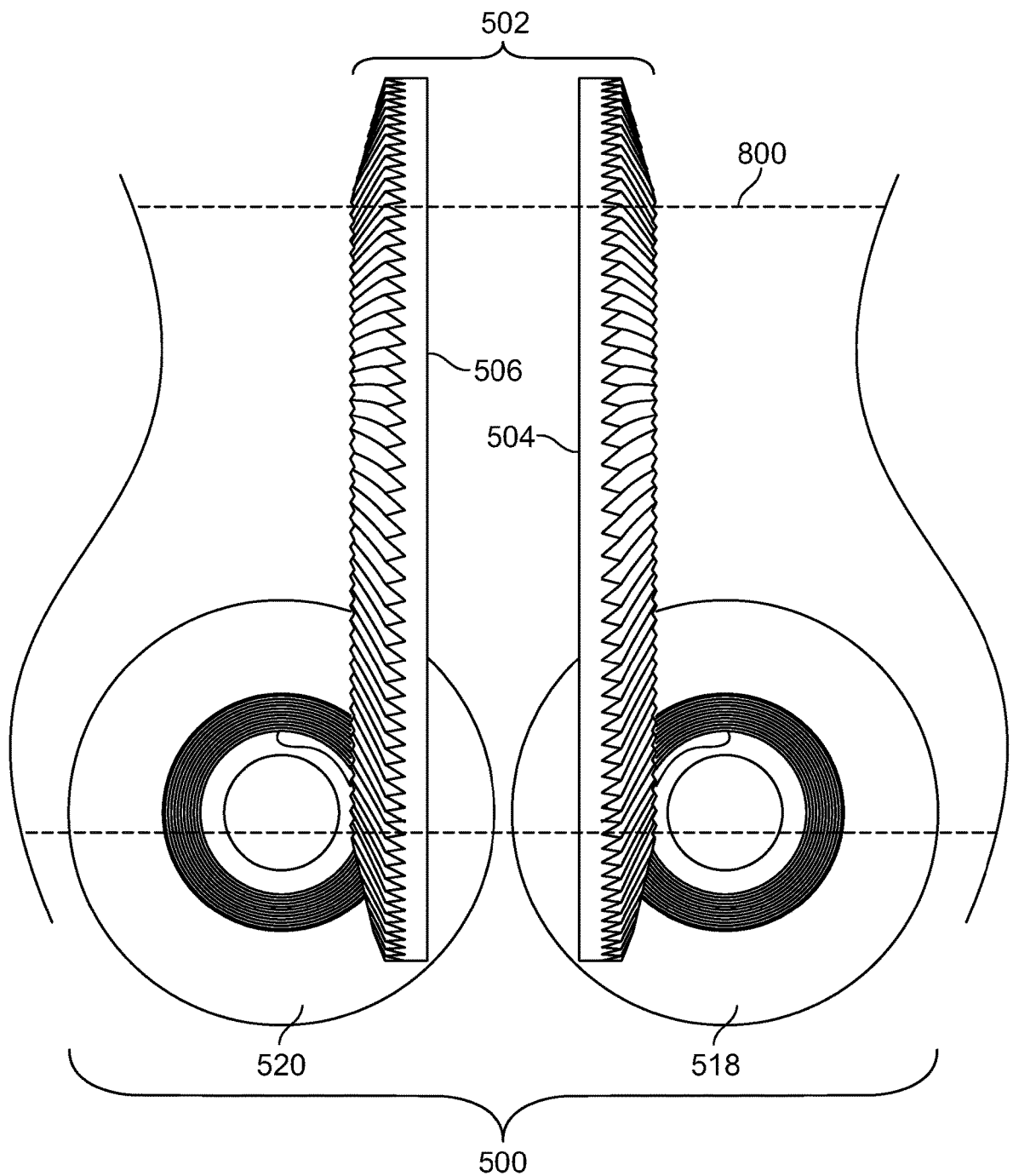
FIG. 8 is a front view of the gear assembly shown in FIG. 5.

FIG. 5 is a perspective view of an embodiment of another gear assembly 500. FIG. 6 is a top view of the gear assembly 500 shown in FIG. 5. FIG. 7 is a side view of the gear assembly 500 shown in FIG. 5. FIG. 8 is a front view of the gear assembly 500 shown in FIG. 5. The gear assembly 500 includes an actuation gear 502 formed from plural (e.g., two) separate and separable single piece gear bodies 504, 506. Optionally, the gear 502 may be formed as a single, continuous, and/or homogenous body and not plural separate gear bodies 504, 506 that are joined together. As shown in FIG. 5, the gear bodies 504, 506 are spaced apart from each other such that the gear bodies 504, 506 do not engage or otherwise touch each other, and are not connected with each other by another body.

The gear bodies 504, 506 and gear 502 each include a common actuation axis of rotation 508 such that the gear 502 rotates about the axis of rotation 508 along the illustrated direction 510 (or an opposite direction). Similar to the gear bodies 104, 106 shown in FIG. 1, each of the gear bodies 504, 506 include opposite first and second surfaces, with the first surfaces having gear teeth and the second surfaces facing each other. In the illustrated example, the gear bodies 504, 506 are separated from each other (e.g., offset or laterally spaced apart) such that the second surfaces of the gear bodies 504, 506 face, but do not engage or otherwise touch each other. Optionally, the gear bodies 504, 506 may engage each other similar to the gear bodies 104, 106.

The gear assembly 500 may also include plural separate and separable pinion bodies 518, 520. The pinion bodies 518, 520 may be similar to the pinion bodies 118, 120 shown in FIG. 1, and may rotate about (e.g., around) separate pinion axes of rotation 522, 524, which are similar to the axes 122, 124 shown in FIG. 1. The pinion bodies 518, 520 include gear teeth 526, which may be similar to the gear teeth 126 shown in FIG. 1. The axes of rotation 522, 524 of the pinion bodies 518, 520 may be oriented perpendicular or substantially perpendicular to the axis of rotation 508 of the gear 502. Optionally, the axes of rotation 522, 524 may be oriented in another direction with respect to the axis of rotation 508.

The pinion bodies 518, 520 are laterally offset from each other such that the gear teeth 526 of the pinion body 518 engage (e.g., mesh with) the gear teeth on the gear body 504 and the gear teeth 526 of the pinion body 520 engage the gear teeth on the gear body 506. This engagement translates rotation of the pinion bodies 518, 520 into rotation of the gear 502, similar to as described above with respect to the gear assembly 100.

The pinion bodies 518, 520 may be rotated by two or more torque generating devices 532, 534. Each of the devices 532, 534 may be similar to the device 132 shown in FIG. 1. Optionally, the devices 532, 534 may be different from each other, such as in the amount of torque generated by each device 532, 534. The devices 532, 534 can be synchronized with each other so that the pinion bodies 518, 520 are rotated at the same speed. The gear 502 may be coupled with one or more other components, such as a shaft, rod, or other device, such that rotation of the pinion bodies 518, 520 by the devices 532, 534 causes the gear 502 to rotate the one or more other components. For example, a shaft 800 (represented by phantom lines in FIG. 8 and which may be similar to the shaft 200 shown in FIG. 2) may be disposed through the opening in the gear 502 such that the shaft is oriented (e.g., elongated) along the axis of rotation 508). The shaft 800 may be an actuation device or coupled with an actuation device that causes the opening or closing of a valve or other component to move when the shaft 800 is rotated. As a result, rotation of the pinion bodies 518, 520 by the devices 532, 534 is translated by the gear assembly 500 into actuation of the device to which the gear assembly 500 is joined.

As described above, connecting plural pinion bodies 518, 520 with the gear 502 can increase a torque capacity of the gear 502. Additionally or alternatively, using plural torque generating devices 532, 534 to drive (e.g., rotate) the pinion bodies 518, 520 can increase the total amount of torque that can be transferred from the devices 532, 534 to the gear 502. For example, the devices 532, 534 may collectively double the torque that can be provided to the pinion bodies 520 compared to only one of the devices 532, 534. In one aspect, one of the devices 532 or 534 may be a primary torque generating device and the other device 534 or 532 may be a secondary torque generating device. The primary torque generating device can rotate the corresponding pinion body 518 or 520 to rotate the gear 502 when the torque needed to rotate the shaft 800 is less than an upper limit or other threshold on the torque that can be provided by the primary torque generating device. The secondary torque generating device may not provide torque to the other pinion body 520 or 518. When the torque needed to rotate the shaft 800 or gear 502 exceeds this limit or threshold, the secondary torque generating device may provide additional torque to rotate the corresponding pinion body 518 or 520. As a result, the total torque provided by both devices 532, 534 may be increased above the limit or threshold.

Figure 9:
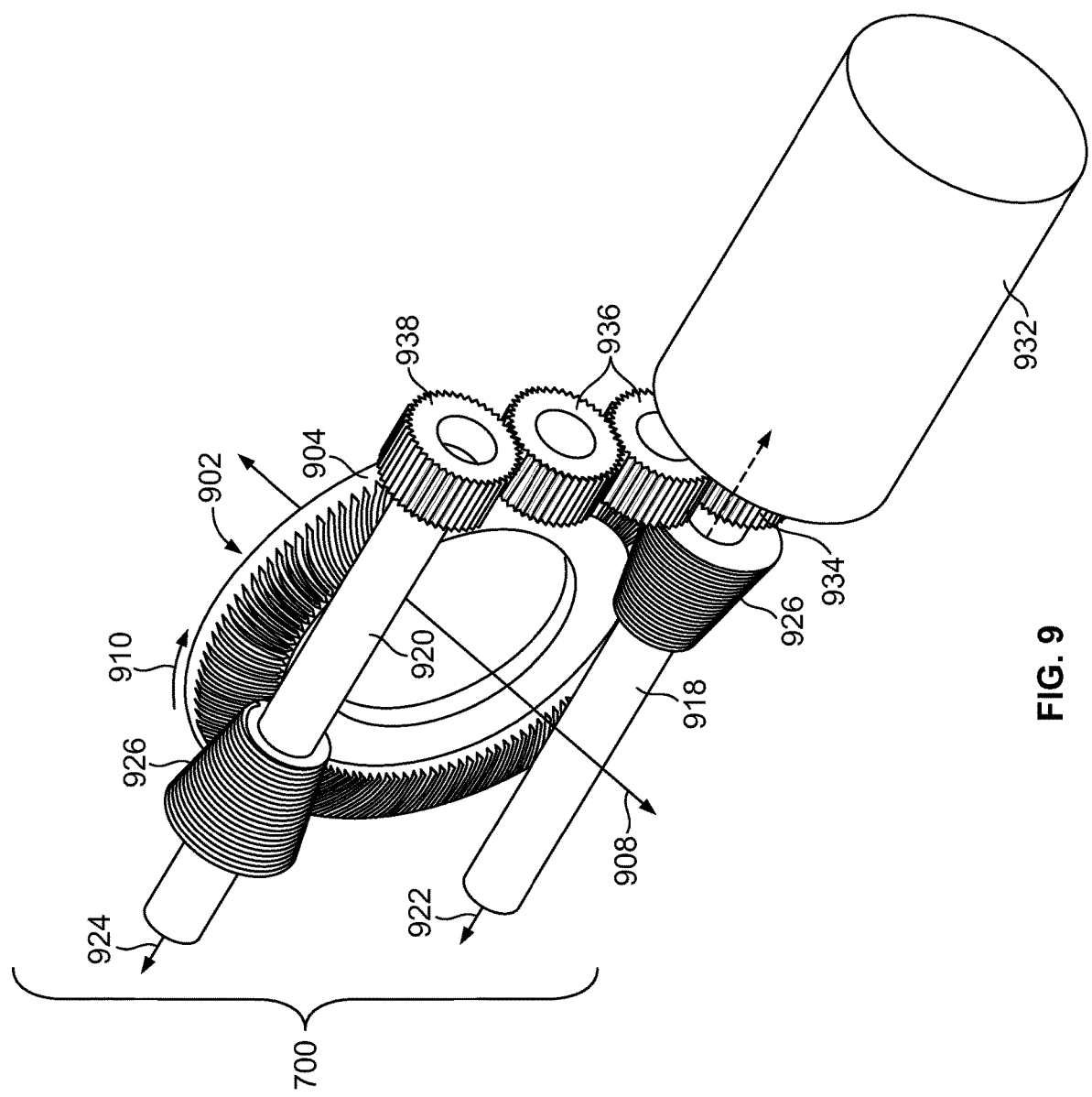
FIG. 9 is a perspective view of an embodiment of another gear assembly.
Figure 10:
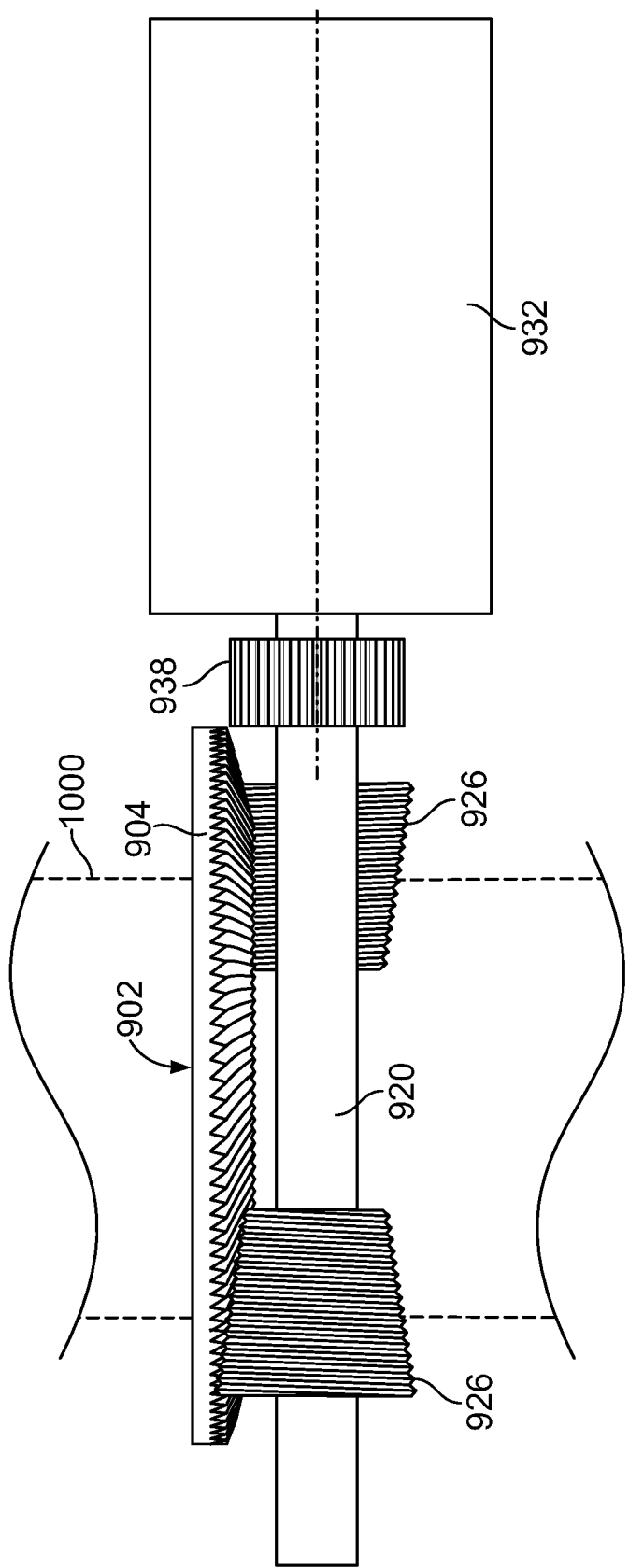
FIG. 10 is a top view of the gear assembly shown in FIG. 9.
Figure 11:
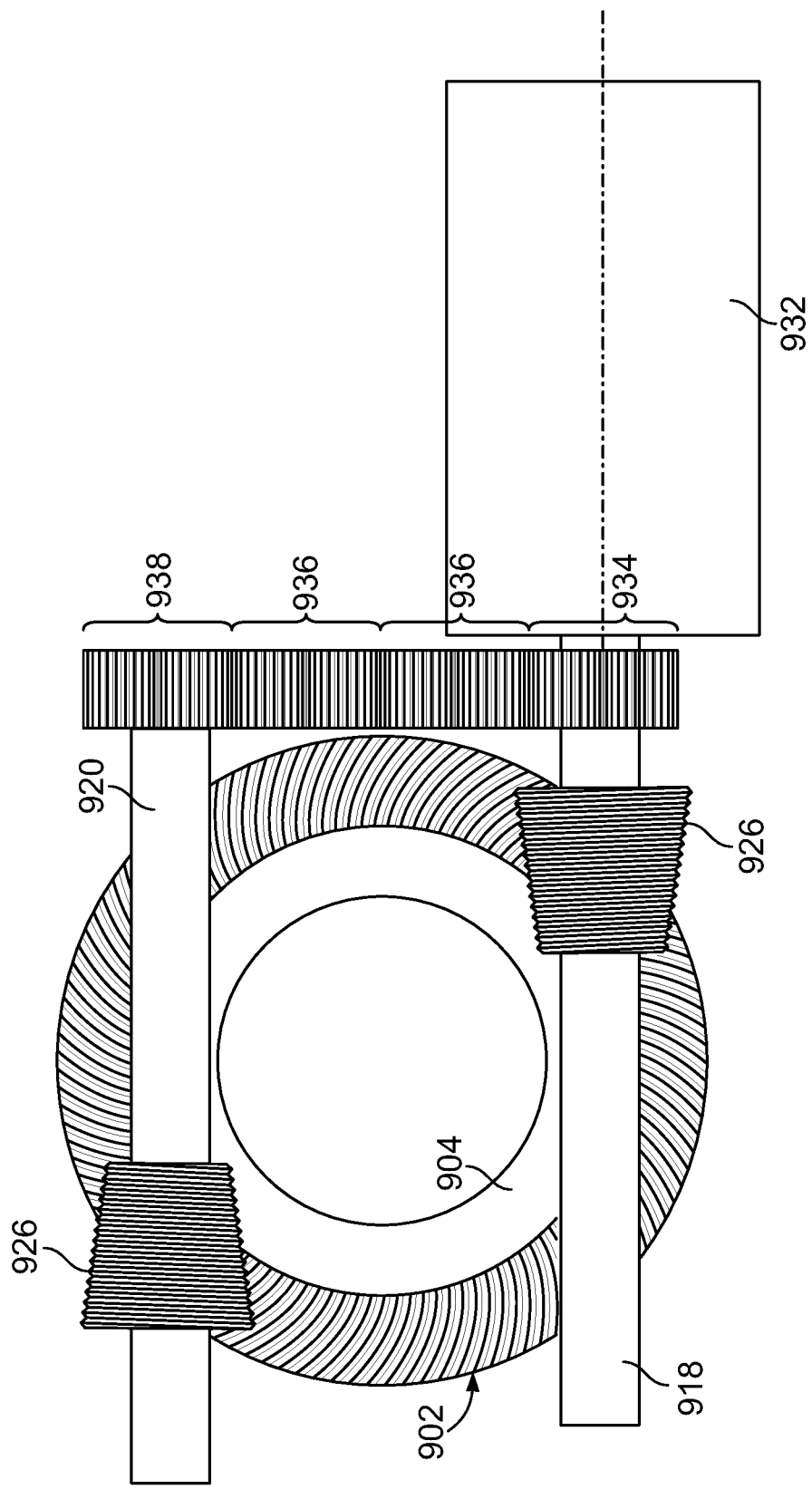
FIG. 11 is a side view of the gear assembly shown in FIG. 9.
Figure 12:
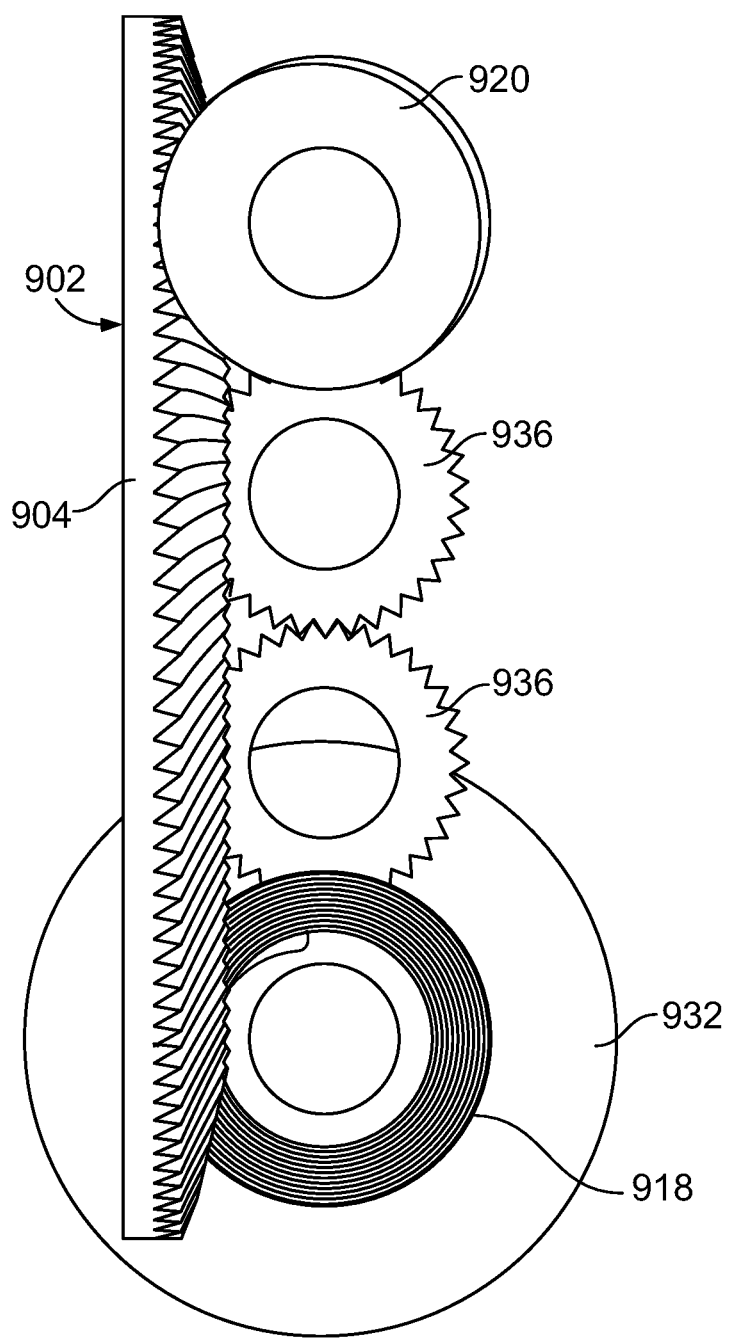
FIG. 12 is a front view of the gear assembly shown in FIG. 9.

FIG. 9 is a perspective view of an embodiment of another gear assembly 900. FIG. 10 is a top view of the gear assembly 900 shown in FIG. 9. FIG. 11 is a side view of the gear assembly 900 shown in FIG. 9. FIG. 12 is a front view of the gear assembly 900 shown in FIG. 9. The gear assembly 900 includes an actuation gear 902 formed from a single piece gear body 904. For example, in contrast to the gear assemblies 100, 500 shown in FIGS. 1 through 8, the gear 902 may be formed from only one gear body 904, which may be similar to the gear body 104, 504 shown in FIGS. 1 through 8. Optionally, the gear 902 may be formed from the gear body 106 or 506.

The gear body 904 and gear 902 each include a common actuation axis of rotation 908 such that the gear 902 rotates about the axis of rotation 908 along the illustrated direction 910 (or an opposite direction). Similar to the gear bodies 104, 504, the gear body 904 includes a first surface having gear teeth.

The gear assembly 900 may also include plural separate and separable pinion bodies 918, 920. Similar to the pinion bodies 118, 120, the pinion bodies 918, 920 rotate about separate pinion axes of rotation 922, 924. The axes of rotation 922, 924 are vertically offset (e.g., spaced apart) from each other such that the axes of rotation 922, 924 are not in-line (e.g., collinear) with each other in the illustrated example. For example, the illustrated pinion bodies 918, 920 are arranged in parallel and offset positions in a co-planar arrangement on the outside and adjacent to the same first surface of the gear 902 (as opposed to being on opposite sides of the gear as in the gear assemblies 100, 500). The axes of rotation 922, 924 of the pinion bodies 918, 920 may be perpendicular or substantially perpendicular to the axis of rotation 908 of the gear 902. Optionally, the axes of rotation 922, 924 may be oriented in a different direction with respect to the axis of rotation 908.

The pinion bodies 918, 920 include gear teeth 926 that may be similar to the gear teeth 126, 526. The pinion bodies 918, 920 are vertically offset from each other such that the gear teeth 926 for the pinion bodies 918, 920 engage (e.g., mesh with) the gear teeth of the gear 902 on the same surface at the same time. This engagement between the teeth 926 of the pinion bodies 918, 920 and the teeth of the gear 902 translates rotation of the pinion bodies 918, 920 into rotation of the gear 902.

In operation, the pinion bodies 918, 920 may be rotated by a torque generating device 932. The torque generating device 932 may be similar to one or more of the devices 132, 532, 534 shown in FIGS. 1 through 8. In the illustrated example, the pinion bodies 918, 920 are rotated by a single torque generating device 932. Optionally, plural devices 932 may be used. The device 932 includes or is coupled to a primary input drive gear 934. The device 934 can rotate the gear 934 around an axis of rotation that is coextensive with, collinear with, or the same as the axis of rotation 922 of the pinion body 918. The pinion body 918 may be coupled with the gear 934 and/or include the gear 934, such that rotation of the gear 934 causes rotation of the pinion body 918 around the axis of rotation 922.

One or more drive gears 936 are connected with the input drive gear 934 such that rotation of the drive gear 934 is translated into rotation of the drive gears 936. While two drive gears 936 are shown, alternatively, a single drive gear 936 or more than two drive gears 936 may be used. The other pinion body 920 includes or is coupled with an additional drive gear 938. The teeth of the drive gears 934, 936, 938 mesh with each other such that rotation of the drive gear 934 and the pinion body 918 by the device 932 is translated into rotation of the other pinion body 920. The drive gears 934, 936, and/or 938 synchronize the rotations of the pinion bodies 918, 920 such that the pinion bodies 918, 920 rotate at the same or substantially the same speed.

As shown in FIG. 9, the teeth 926 of the pinion bodies 918, 920 are located on opposite ends of the pinion bodies 918, 920. The teeth 926 of the pinion body 918 are located at or closer to an end of the pinion body 918 that is closer to the torque generating device 932 than the opposite end of the pinion body 918, and the teeth 926 of the pinion body 920 are located at or closer to an end of the pinion body 920 that is farther from the torque generating device 932 than the opposite end of the pinion body 920. Also as shown in FIGS. 9, 10, and 12, the pinion bodies 918, 920 may be coplanar with each other. For example, the pinion axes of rotation 922, 924 of the pinion bodies 928, 920 may be disposed in the same plane such that the axes of rotation 922, 924 are coplanar. The plane in which the axes of rotation 922, 924 are located can be parallel to the gear 902. For example, the plane in which the axes of rotation 922, 924 are located may not be intersected by the gear 902.

Similar to as described above with respect to the gears 102, 502 shown in FIGS. 1 through 8, the gear 902 may be coupled with one or more other components, such as a shaft, rod, or other device (e.g., the shaft 1000 shown in phantom lines in FIG. 10), such that rotation of the pinion bodies 918, 920 by the device 932 causes the gear 902 to rotate the one or more other components. The shaft 1000 may be an actuation device or coupled with an actuation device that causes the opening or closing of a valve or other component to move when the shaft 1000 is rotated. As a result, rotation of the pinion bodies 918, 920 by the device 932 is translated by the gear assembly 900 into actuation of the device to which the gear assembly 900 is joined, such as by the shaft 900. In the illustrated example, the pinion bodies 918, 920 rotate around the respective axes of rotation without linearly moving. For example, the pinion bodies 918, 920 may not move along the axes of rotation, such as in left or right directions in the view of FIG. 10. In contrast to a rack and pinion arrangement, where a gear engages a rack that linearly moves relative to the gear, the pinion bodies 918, 920 and/or gear 902 may rotate, but not linearly move, in one embodiment.

As described above, connecting plural pinion bodies 918, 920 with the device 932 and with the gear 902 can increase a torque capacity of the gear 902. Additionally or alternatively, coupling the plural pinion bodies 918, 920 with the same side of the gear 902 can reduce the size, weight, and/or complexity of the gear 902 (e.g., because fewer gear bodies may be used to form the gear 902).

Figure 13:
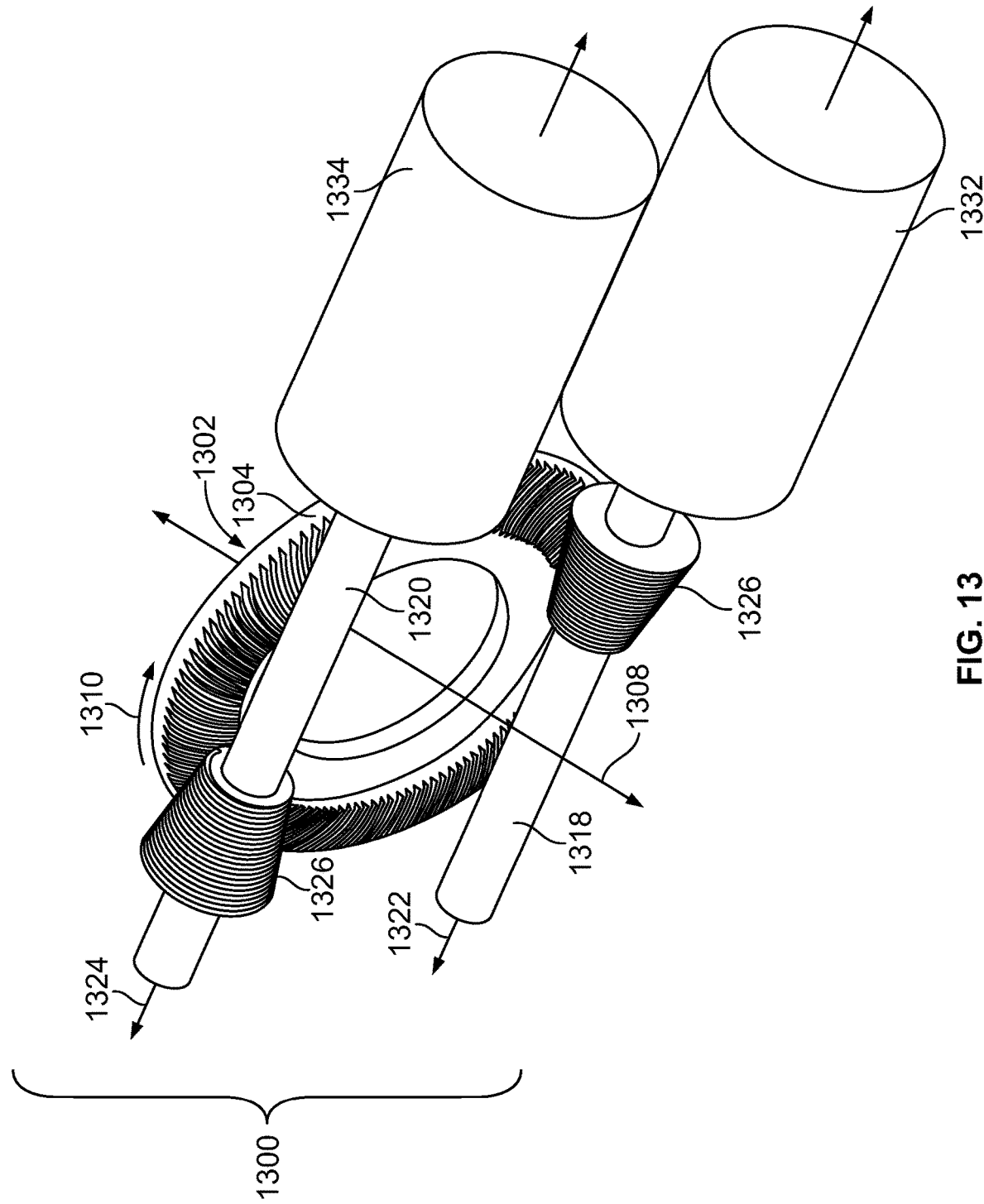
FIG. 13 is a perspective view of an embodiment of another gear assembly.
Figure 14:
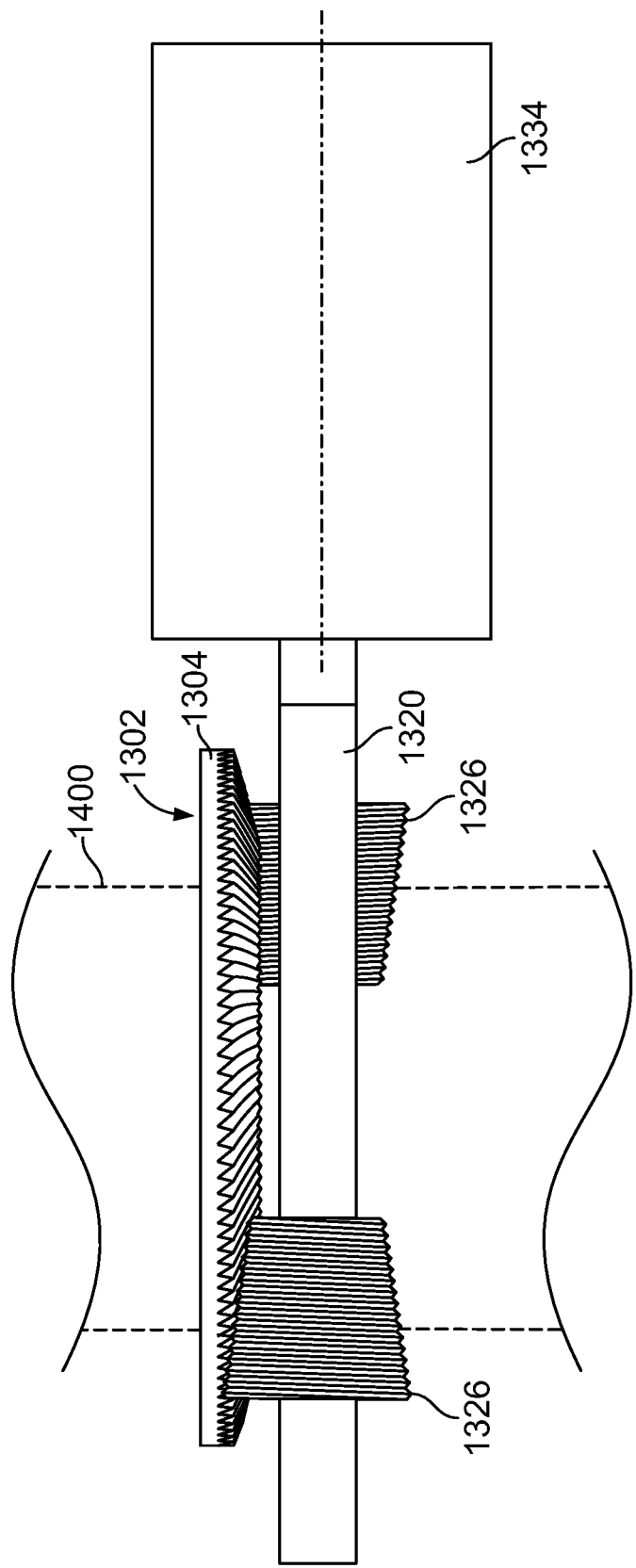
FIG. 14 is a top view of the gear assembly shown in FIG. 13.
Figure 15:
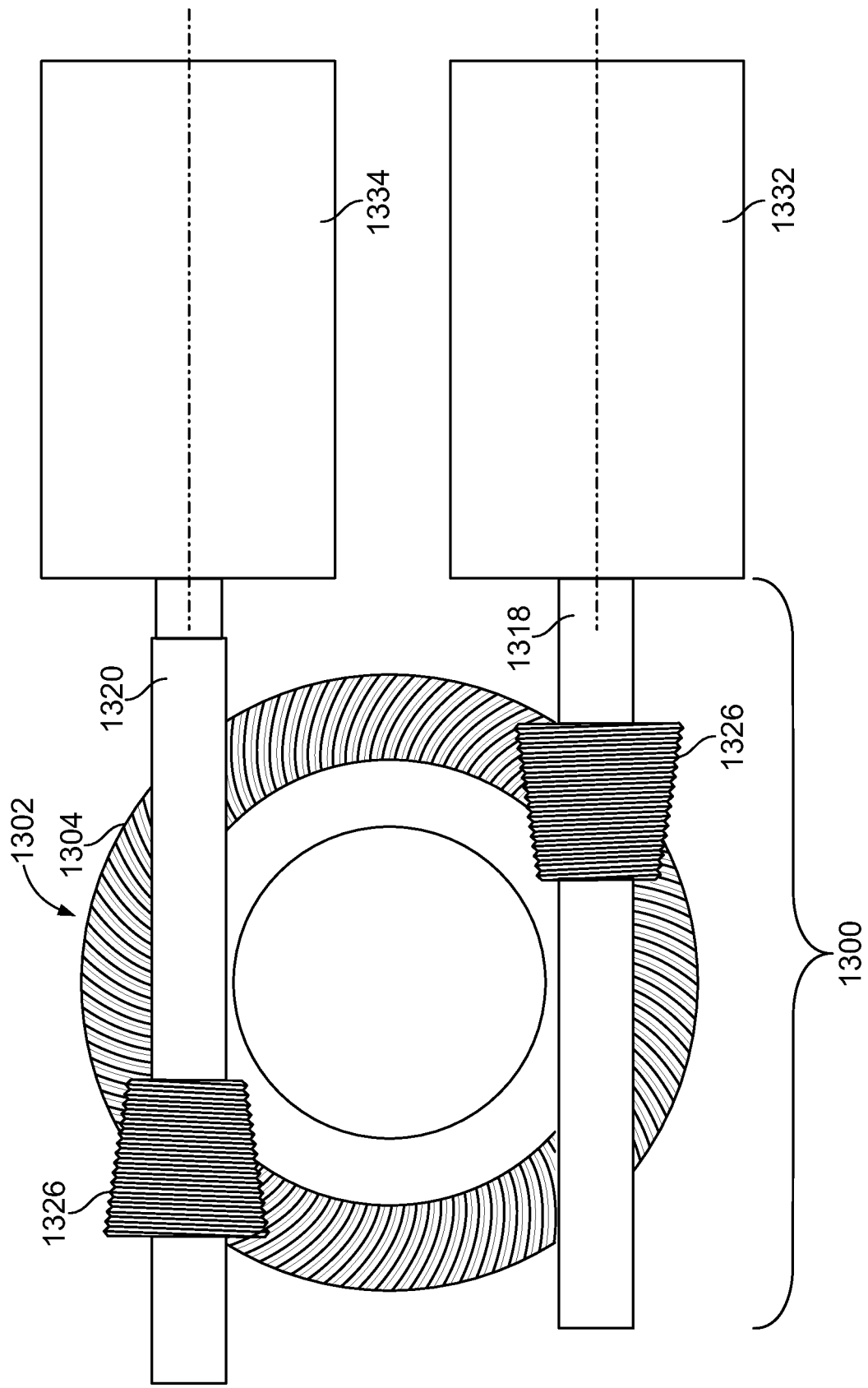
FIG. 15 is a side view of the gear assembly shown in FIG. 13.
Figure 16:
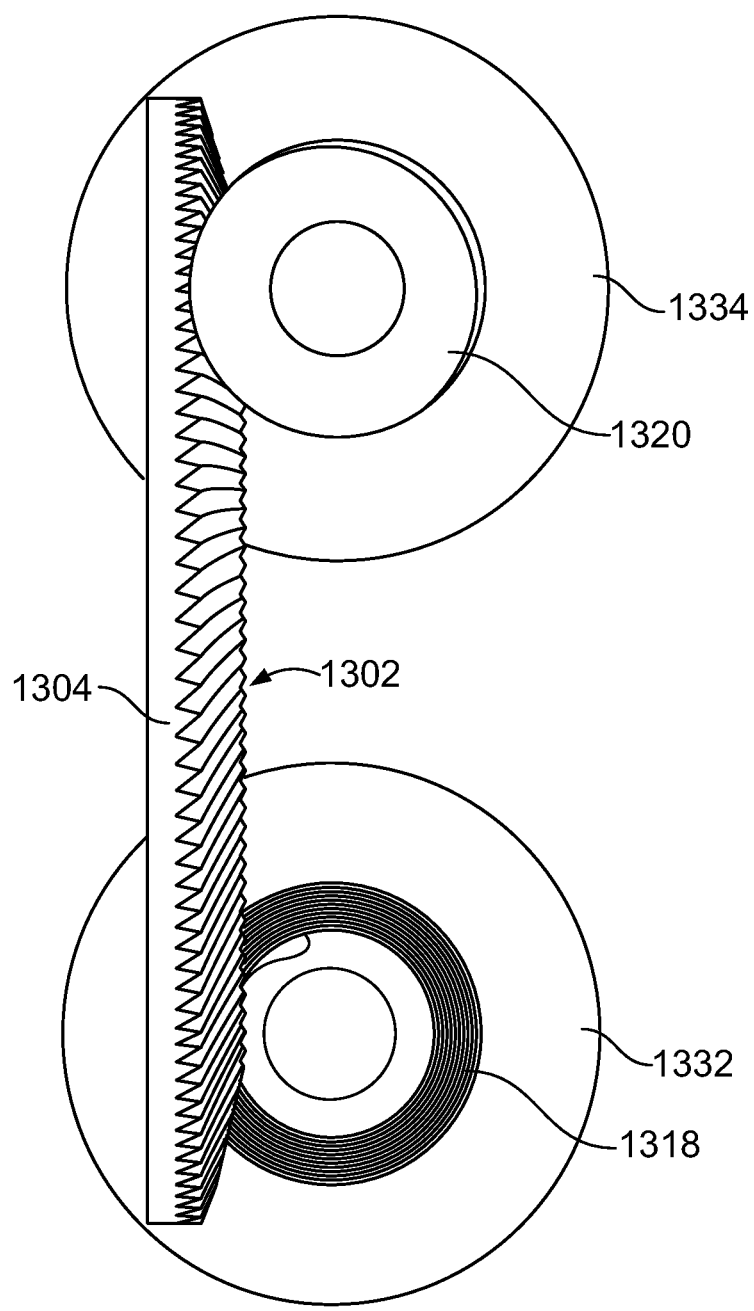
FIG. 16 is a front view of the gear assembly shown in FIG. 13.

FIG. 13 is a perspective view of an embodiment of another gear assembly 1300. FIG. 14 is a top view of the gear assembly 1300 shown in FIG. 13. FIG. 15 is a side view of the gear assembly 1300 shown in FIG. 13. FIG. 16 is a front view of the gear assembly 1300 shown in FIG. 13. The gear assembly 1300 includes an actuation gear 1302 formed from a single piece gear body 1304, similar to the gear 902 and gear body 904 shown in FIG. 9. Optionally, the gear 1302 may be formed from another gear body, such as the gear body 106 or 506, or a combination of gear bodies, such as the gear bodies 104, 106 or 504, 506.

The gear body 1304 and gear 1302 each include a common actuation axis of rotation 1308 such that the gear 1302 rotates about the axis of rotation 1308 along the illustrated direction 1310 (or an opposite direction). Similar to the gear bodies 104, 504, 904 shown in FIGS. 1 through 12, the gear body 1304 includes a first surface having gear teeth. The gear assembly 1300 may also include plural separate and separable pinion bodies 1318, 1320. Similar to the pinion bodies 118, 120, the pinion bodies 1318, 1320 rotate about separate pinion axes of rotation 1322, 1324. The axes of rotation 1322, 1324 are vertically offset (e.g., spaced apart) from each other such that the axes of rotation 1322, 1324 are not in-line (e.g., collinear) with each other in the illustrated example. For example, the illustrated pinion bodies 1318, 1320 are arranged in parallel and offset positions in a co-planar arrangement on the outside and adjacent to the same first surface of the gear 1302 (as opposed to being on opposite sides of the gear). The axes of rotation 1322, 1324 of the pinion bodies 1318, 1320 are oriented perpendicular or substantially perpendicular to the axis of rotation 1308 of the gear 1302. Optionally, the axes of rotation 1322, 1324 may be oriented in another direction with respect to the axis of rotation 1308.

The pinion bodies 1318, 1320 include gear teeth 1326 that may be similar to the gear teeth 126, 526, 926 shown in FIGS. 1 through 12. The pinion bodies 1318, 1320 are vertically offset from each other such that the gear teeth 1326 of the pinion bodies 1318, 1320 engage (e.g., mesh with) the gear teeth of the gear 1302 on the same surface of the gear 1302 at the same time. This engagement between the teeth 1326 of the pinion bodies 1318, 1320 and the teeth of the gear 1302 translates rotation of the pinion bodies 1318, 1320 into rotation of the gear 1302.

The pinion bodies 1318, 1320 may be rotated by two or more torque generating devices 1332, 1334, similar to the pinion bodies 518, 520 and the devices 532, 534 shown in FIGS. 5 through 8. Each of the devices 1332, 1334 may be similar to the device 132 shown in FIG. 1. Optionally, the devices 1332, 1334 may be different from each other, such as in the amount of torque generated by each device 1332, 1334. The devices 1332, 1334 can be synchronized with each other so that the pinion bodies 1318, 1320 are rotated at the same speed. The gear 1302 may be coupled with one or more other components, such as a shaft, rod, or other device, such that rotation of the pinion bodies 1318, 1320 by the devices 1332, 1334 causes the gear 1302 to rotate the one or more other components. For example, a shaft 1400 (represented by phantom lines in FIG. 14 and which may be similar to the shaft 200 shown in FIG. 2) may be disposed through the opening in the gear 1302 such that the shaft is oriented (e.g., elongated) along the axis of rotation 1308). The shaft 1400 may be an actuation device or coupled with an actuation device that causes the opening or closing of a valve or other component to move when the shaft 1400 is rotated. As a result, rotation of the pinion bodies 1318, 1320 by the devices 1332, 1334 is translated by the gear assembly 1300 into actuation of the device to which the gear assembly 1300 is joined.

As shown in FIG. 13, the teeth 1326 of the pinion bodies 1318, 1320 are located on opposite ends of the pinion bodies 1318, 1320. The teeth 1326 of the pinion body 1318 are located at or closer to an end of the pinion body 1318 that is closer to the torque generating device 1332 than the opposite end of the pinion body 1318, and the teeth 1326 of the pinion body 1320 are located at or closer to an end of the pinion body 1320 that is farther from the torque generating device 1332 than the opposite end of the pinion body 1320. Also as shown in FIGS. 13, 14, and 15, the pinion bodies 1318, 1320 may be coplanar with each other. For example, the pinion axes of rotation 1322, 1324 of the pinion bodies 1318, 1320 may be disposed in the same plane such that the axes of rotation 1322, 1324 are coplanar. The plane in which the axes of rotation 1322, 1324 are located can be parallel to the gear 1302. For example, the plane in which the axes of rotation 1322, 1324 are located may not be intersected by the gear 1302.

In the illustrated example, the pinion bodies 1318, 1320 rotate around the respective axes of rotation without linearly moving. For example, the pinion bodies 1318, 1320 may not move along the axes of rotation, such as in left or right directions in the view of FIG. 14. In contrast to a rack and pinion arrangement, where a gear engages a rack that linearly moves relative to the gear, the pinion bodies 1318, 1320 and/or gear 1302 may rotate, but not linearly move, in one embodiment.

As described above, connecting plural pinion bodies 1318, 1320 with the gear 1302 can increase a torque capacity of the gear 1302. Additionally or alternatively, coupling the plural pinion bodies 1318, 1320 with the same side of the gear 1302 can reduce the size, weight, and/or complexity of the gear 1302 (e.g., because fewer gear bodies may be used to form the gear 1302). Additionally or alternatively, using plural torque generating devices 1332, 1334 to drive (e.g., rotate) the pinion bodies 1318, 1320 can increase the total amount of torque that can be transferred from the devices 1332, 1334 to the gear 1302, also as described above.

In one or more of the embodiments of the inventive subject matter set forth herein, a rotary input force supplied from a torque generating device may be applied to the pinion bodies to drive the gear assemblies in one or both directions. The rotary input force can be generated by a number of methods, including but not limited to, manual hand crank or hand wheel device, electrically powered motors (such as AC or DC drive or servomotors), hydraulic motors, or the like. The rotary input force may be supplied to the pinion bodies through a common gear train that includes one or more drive gears and which acts to synchronize rotation of the pinion bodies with respect to each other and the mating gear bodies (e.g., gears or gear teeth) of the pinion bodies. Optionally, rotary input forces may be independently supplied to each pinion body by separate torque generating devices attached to each respective pinion body. These rotary input forces may be synchronized with each other, such as by the separate torque generating devices rotating the separate pinion bodies at the same speed. The torque generating devices may be synchronized by incorporating control software in combination with speed and/or position sensing devices affixed to the pinion bodies and/or gear bodies, or using other techniques and/or components. To further aid in the synchronization of the pinion bodies with respect to their associated gear bodies, supplemental mechanical components may also be incorporated in either or both the pinion bodies and gear bodies consisting of compression or torsion spring devices situated axially within or around the shaft and hub features in such a manner as to absorb or reduce the amount of radial and/or axial play in the assemblies and permit balanced load sharing between the various components of the gear assemblies.

The separate and separable gear bodies used to form one or more of the gears described herein may be configured in multiple ways to enable attachment to a hub or bearing mechanism, which may be represented by the shafts shown in phantom lines in the Figures. An operating load such as a valve control may be connected to the gear assemblies such that rotation of the gears in one direction by the pinion bodies and the torque generating devices opens a valve and rotation of the gears in another direction by the pinion bodies and the torque generating devices closes the valve.

One or more of the gear assemblies described herein may be enclosed or housed in a casing, which acts to contain the gear and pinion bodies along with their respective supporting elements such as bearings and shafts. The casing may also be configured in numerous manners to enable attachment to a valve or other device that is actuated by the respective gear assembly.

In one aspect, one or more of the gear assemblies described herein may be used to provide high density power transmission for systems such as hydraulic systems, pneumatic systems, other geared mechanisms such as planetary or harmonic drives and worm gearing, traction motors/drives, or the like. With respect to submersible vehicles such as submarines, the gear assemblies may be used to control hydraulic actuators of onboard mechanical actuation systems. Some examples include, but are not limited to, navigational or steering control surfaces such as bow planes or rudders, propulsion control mechanisms, communication systems such as retractable antennae or periscopes, actuation of control valves incorporated in fluid or air transfer pipes and systems contained within the pressure hull of the submarine, or the like.

In an embodiment, a gear assembly includes an actuation gear and plural separate pinion bodies. The actuation gear has first gear teeth on one or more surfaces of the gear and is configured to rotate around an actuation axis of rotation. The pinion bodies have second gear teeth configured to mesh with the first gear teeth of the actuation gear in plural separate mesh zones of the actuation gear. Each of the plural separate pinion bodies are configured to be rotated about respective pinion axes of rotation to cause rotation of the actuation gear around the actuation axis of rotation.

In one aspect, the pinion axes of rotation of the plural separate pinion bodies are oriented perpendicular to the actuation axis of rotation of the actuation gear.

In one aspect, the plural separate pinion bodies are configured to be coupled with one or more drive gears connected with a torque generating device that generates torque to rotate the plural separate pinion bodies such that rotation of the plural separate pinion bodies is synchronized by rotation of the one or more drive gears by the torque generating device.

In one aspect, the rotation of the plural separate pinion bodies is synchronized when the plural separate pinion bodies rotate at a common speed.

In one aspect, the torque generating device is a single motor.

In one aspect, the actuation gear includes the first gear teeth on opposite first surfaces of the actuation gear and the plural separate pinion bodies are laterally offset from each other such that the second gear teeth of the plural separate pinion bodies engage the first gear teeth of the actuation gear on the opposite surfaces of the actuation gear.

In one aspect, the actuation gear is formed from plural gear bodies each having one of the first surfaces and an opposite second surface. The second surfaces of the plural gear bodies can face each other.

In one aspect, the plural gear bodies are offset from each other such that the second surfaces of the plural gear bodies are spaced apart from each other.

In one aspect, the plural separate pinion bodies are configured to be coupled with plural separate torque generating devices so the plural separate torque generating devices separately rotate the plural separate pinion bodies.

In one aspect, the actuation gear includes the first gear teeth on opposite surfaces of the actuation gear and the plural separate pinion bodies are laterally offset from each other such that the second gear teeth of the plural separate pinion bodies engage the first gear teeth of the actuation gear on the opposite surfaces of the actuation gear.

In one aspect, the plural separate pinion bodies are configured to be separately rotated by the plural separate torque generating devices at a common speed.

In one aspect, the pinion axes of rotation are coplanar in a plane that is disposed on one side of the actuation gear such that the actuation gear and the plane are parallel to each other.

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the presently described inventive subject matter. It is to be understood that no limitation with respect to the specific embodiments illustrated is intended or should be inferred. The disclosure is intended to cover by the appended claims all such modifications as fall within the scope of the claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A gear assembly comprising:
   an actuation gear having first gear teeth on one or more surfaces of the gear, the actuation gear configured to rotate around an actuation axis of rotation; and
   plural separate pinion bodies having second gear teeth configured to mesh with the first gear teeth of the actuation gear in plural separate mesh zones of the actuation gear, wherein each of the plural separate pinion bodies are configured to be rotated about respective pinion axes of rotation to cause rotation of the actuation gear around the actuation axis of rotation,
   wherein the plural separate pinion bodies are configured to be coupled with plural separate torque generating devices so the plural separate torque generating devices separately rotate the plural separate pinion bodies.

2. The gear assembly of claim 1, wherein the pinion axes of rotation of the plural separate pinion bodies are oriented perpendicular to the actuation axis of rotation of the actuation gear.

3. The gear assembly of claim 1, wherein the plural separate pinion bodies are configured to be coupled with one or more drive gears connected with the torque generating devices that generate torque to rotate the plural separate pinion bodies such that rotation of the plural separate pinion bodies is synchronized by rotation of the one or more drive gears by the torque generating devices.

4. The gear assembly of claim 3, wherein the rotation of the plural separate pinion bodies is synchronized when the plural separate pinion bodies rotate at a common speed.

5. The gear assembly of claim 3, wherein the torque generating devices are motors.

6. The gear assembly of claim 1, wherein the actuation gear includes the first gear teeth on opposite first surfaces of the actuation gear and the plural separate pinion bodies are laterally offset from each other such that the second gear teeth of the plural separate pinion bodies engage the first gear teeth of the actuation gear on the opposite surfaces of the actuation gear.

7. The gear assembly of claim 6, wherein the actuation gear is formed from plural gear bodies each having one of the first surfaces and an opposite second surface, wherein the second surfaces of the plural gear bodies face each other.

8. The gear assembly of claim 7, wherein the plural gear bodies are offset from each other such that the second surfaces of the plural gear bodies are spaced apart from each other.

9. The gear assembly of claim 1, wherein the actuation gear includes the first gear teeth on opposite surfaces of the actuation gear and the plural separate pinion bodies are laterally offset from each other such that the second gear teeth of the plural separate pinion bodies engage the first gear teeth of the actuation gear on the opposite surfaces of the actuation gear.

10. The gear assembly of claim 1, wherein the plural separate pinion bodies are configured to be separately rotated by the plural separate torque generating devices at a common speed.

11. The gear assembly of claim 1, wherein the pinion axes of rotation are coplanar in a plane that is disposed on one side of the actuation gear such that the actuation gear and the plane are parallel to each other.

12. A gear assembly comprising:
    an actuation gear having first gear teeth on one or more surfaces of the gear; and
    plural separate pinion bodies having second gear teeth configured to mesh with the first gear teeth of the actuation gear in plural separate mesh zones of the actuation gear, the plural separate pinion bodies are configured to be rotated about respective parallel pinion axes of rotation to cause rotation of the actuation gear around an actuation axis of rotation of the actuation gear, wherein the pinion axes of rotation are oriented perpendicular to the actuation axis of rotation,
    wherein the plural separate pinion bodies are configured to be coupled with plural separate torque generating devices so the plural separate torque generating devices separately rotate the plural separate pinion bodies.

13. The gear assembly of claim 12, wherein the plural separate pinion bodies are configured to be coupled with one or more drive gears connected with the torque generating devices that generate torque to rotate the plural separate pinion bodies such that rotation of the plural separate pinion bodies is synchronized by rotation of the one or more drive gears by the torque generating devices.

14. The gear assembly of claim 13, wherein the rotation of the plural separate pinion bodies is synchronized when the plural separate pinion bodies rotate at a common speed.

15. The gear assembly of claim 13, wherein the torque generating devices are motors.

16. The gear assembly of claim 12, wherein the actuation gear includes the first gear teeth on opposite first surfaces of the actuation gear and the plural separate pinion bodies are laterally offset from each other such that the second gear teeth of the plural separate pinion bodies engage the first gear teeth of the actuation gear on the opposite surfaces of the actuation gear.

17. The gear assembly of claim 16, wherein the actuation gear is formed from plural gear bodies each having one of the first surfaces and an opposite second surface, wherein the second surfaces of the plural gear bodies face each other.

18. The gear assembly of claim 16, wherein the plural gear bodies are offset from each other such that the second surfaces of the plural gear bodies are spaced apart from each other.

19. The gear assembly of claim 12, wherein the actuation gear includes the first gear teeth on opposite surfaces of the actuation gear and the plural separate pinion bodies are laterally offset from each other such that the second gear teeth of the plural separate pinion bodies engage the first gear teeth of the actuation gear on the opposite surfaces of the actuation gear.

20. The gear assembly of claim 12, wherein the plural separate pinion bodies are configured to be separately rotated by the plural separate torque generating devices at a common speed.

21. The gear assembly of claim 12, wherein the pinion axes of rotation are coplanar in a plane that is disposed on one side of the actuation gear such that the actuation gear and the plane are parallel to each other.

\* \* \* \* \*